United States Patent

[11] 3,558,885

| [72] | Inventor | John P. W. Flemming<br>Harlow, Essex, England |
|---|---|---|
| [21] | Appl. No. | 765,925 |
| [22] | Filed | Oct. 8, 1968 |
| [45] | Patented | Jan. 26, 1971 |
| [73] | Assignee | International Standard Electric Corporation<br>New York, N.Y.<br>a corporation of Delaware |
| [32] | Priority | Oct. 25, 1967 |
| [33] | | Great Britain |
| [31] | | 48468/67 |

[54] SCANNING MICROSCOPE WITH FEEDBACK MEANS TO MAINTAIN A CONSTANT TARGET CURRENT
4 Claims, 2 Drawing Figs.

[52] U.S. Cl. .................................................. 250/49.5
[51] Int. Cl. .................................................. H01j 37/26,
G01n 23/04
[50] Field of Search ........................................... 250/49.58,
49.59, 49.51

[56] References Cited
UNITED STATES PATENTS

| 2,418,228 | 4/1947 | Hillier ........................ | 250/49.58 |
| 3,219,817 | 11/1965 | Mollenstedt ................ | 250/49.51 |
| 3,351,755 | 11/1967 | Hasler ........................ | 250/49.58 |
| 3,404,271 | 10/1968 | Lehovec et al. ............. | 250/49.51 |

*Primary Examiner*—James W. Lawrence
*Assistant Examiner*—C. E. Church
*Attorneys*—C. Cornell Remsen, Jr., Walter J. Baum, Paul W. Hemminger, Percy P. Lantzy and Thomas E. Kristofferson ABSTRACT: The invention includes a scanning mirror microscope having a feedback control loop between target and cathode to stabilize the target current. It is then possible to obtain a quantitative plot of the target voltage by scanning an electron beam over the target surface.

The invention also includes a scanning electron microscope having a feedback control loop between the target and the output of a velocity analyzer of secondary electrons emitted from the target to obtain the same quantitative plot.

In either case, examination tests on semiconductor integrated circuits are made possible.

PATENTED JAN 26 1971

3,558,885

Inventor
J. P. W. FLEMMING

By *[signature]*
Attorney

SCANNING MICROSCOPE WITH FEEDBACK MEANS TO MAINTAIN A CONSTANT TARGET CURRENT

BACKGROUND OF THE INVENTION

This invention relates to scanning mirror microscopes and scanning electron microscopes.

For use in this specification, the term velocity analyzer is hereby defined to mean a device which gives an output in proportion to the rate of arrival at the analyzer of electrons having energies lying within a certain narrowly-defined range.

It is well known that a qualitative plot of the voltage variation (expressed as a function of position) across the surface of a specimen may be obtained by making the specimen the target in a scanning mirror microscope. The plot can be obtained by scanning the electron beam of the microscope over the surface of the target and recording the resulting variation in target current. Another method of obtaining the same type of qualitative plot is to make the specimen the target in a scanning electron microscope. In this method, the voltage variation across the target can be derived from a measure of the current output from a velocity analyzer as an electron beam is scanned over the surface of the target. The velocity analyzer is placed to receive the secondary electrons emitted by the target under the influence of the primary electron beam. However in either method, it is not a straightforward matter to derive a quantitative plot of the voltage variation because the voltage variation in each method is a nonlinear function of the current detected. Nevertheless, in many applications, particularly in the examination of semiconductor integrated circuits, it is desirable to obtain a quantitative voltage plot; and this invention improves scanning mirror microscopes and scanning electron microscopes and enables such a plot to be obtained by means of a feedback control loop.

SUMMARY OF THE INVENTION

As applied to scanning mirror microscopes, the invention provides such a microscope that includes a feedback control loop, which in relation to a target inserted into the microscope and the electron beam cathode of the microscope, can be actuated by the output current from the target so that the potential difference between the cathode and the target can be controlled to reduce fluctuations in said output as the electron beam scans the surface of the target.

As applied to scanning electron microscopes, the invention provides such a microscope including a velocity analyzer and a feedback control loop. The loop in relation to a target inserted into the microscope and the velocity analyzer, can be actuated by the output from the velocity analyzer so that the potential of the target can be controlled with respect to the electron energy level accepted by the velocity analyzer in order to reduce fluctuations in said output as the electron beam scans the surface of the target.

The features of the invention will be evident from the following description when considered in connection with the accompanying drawings.

BRIEF DESCRIPTION OF THE DRAWINGS

In the drawings, which are to be regarded as merely illustrative:

With reference to FIG. 1, a scanning mirror microscope is shown including a cathode 10 which is the source of an electron beam, an electron beam forming arrangement 11 complete with facility for scanning the beam, and in the path of the electron beam, a target 12 having a terminal connected at its base. The target 12 is connected by terminal 13, both through a resistor R to ground and through a capacitor 14, to the input of an amplifier 15. The output of amplifier 15 is connected through another capacitor 16 to the cathode 10 and also is connected directly to an output terminal 17. The connection between the target 12 and the cathode 10 is through the two capacitors 14 and 16 and the amplifier 15. The connection forms the feedback path by which the target current is stabilized. The quantitative voltage variation across target 12 may be obtained at the output terminal.

Figure 1:
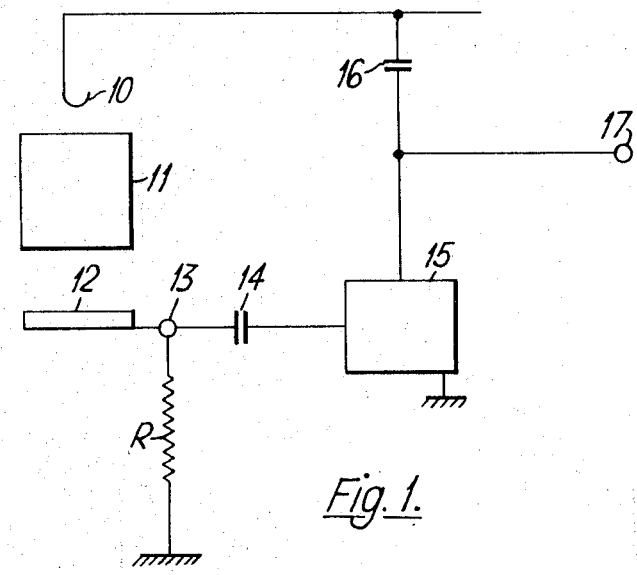
FIG. 1 is a diagram of a scanning mirror microscope incorporating a feedback control loop.

The operation of the loop will be evident from the following analysis. The following notation is used:

$V_T$ the potential of that part of the target which instantaneously intercepts the primary electron beam of the microscope, $V_C$ the potential of the cathode, and $V_A$ the potential of the target terminal 13, where these potentials are referred to ground potential. $V_{TA}$ and $V_{TC}$ are defined by the equations:

$V_{TA} = V_T - V_A$ and $V_{TC} = V_T - V_C$ $A$ (the voltage amplification of the amplifier 15) is defined to be a positive quantity for an inverting amplifier.

$I_T$ is defined as the current flowing from ground to the target 12 through the resistor B.

The same symbols written with lower case letters are used to denote increments in these quantities. For example, as the electron beam scans the target between two adjacent points across, there will be a change in potential $v_{TA}$ in the voltage $V_{TA}$.

In order to prove the effectiveness of the feedback loop in stabilizing target current, it is necessary to show that the effect of the feedback loop is to reproduce the variation $v_{TA}$ as a variation in the voltage at the output terminal 17 (noted as $V_C$).

For this purpose, the conductance "g" of the mirror microscope is defined by:

$$g = \frac{i_T}{v_{TC}}$$

This definition makes "g" is a constant; and to justify the use of "g" as a constant, it will be necessary to show the effect of the feedback loop is to reduce $v_{TC}$ compared to $v_{TA}$.

From the above definitions, the following relationships are obtained.

$v_{TC} = v_T - v_C$
$v_{TA} = v_T - V_A$
$Ri_T = -v_A$      (Ohm's law)
$v_C = -Av_A$ From these relationships and from $g = \dfrac{i_T}{v_{TC}}$ it can be shown that:

$$\frac{v_C}{v_{TA}} = \frac{AgR}{1 + gR + AgR} \quad (1)$$

$$v_C = AgR \cdot v_{TC} \quad (2)$$

$$v_{TC} = \frac{v_{TA}}{1 + gR + AgR} \quad (3)$$

The relationship (1) shows that the voltage at the output terminal approximates the required voltage, provided that A and AgR are large compared to 1. The relationship (2) shows that the expression AgR is the loop gain of the feedback control loop. In other words for an accurate output, the amplifier must have a large gain and the loop gain of the feedback control loop must also be large. The relationship (3) shows that the feedback loop has the effect of reducing the fluctuation magnitude of $v_{TC}$. Further, it shows that if the amplifier gain and loop gain are large, fluctuations of $v_{TC}$ are small compared to the variations in potential across the surface of the target $v_{TA}$. The relationship also indicates that "g" may be assumed to be constant.

Figure 2:
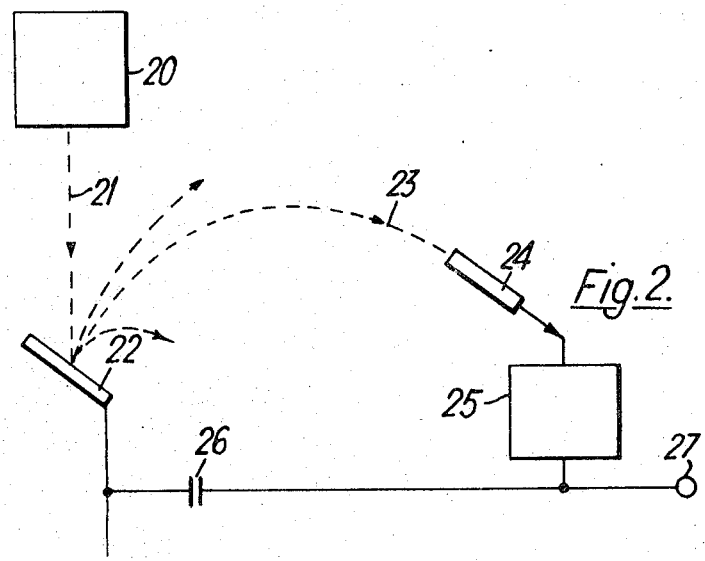
FIG. 2 is a diagram of a scanning electron microscope incorporating a feedback control loop.

With reference to FIG. 2, a scanning electron microscope is shown including an electron beam generator 20, complete with facility for focusing and scanning. An electron beam 21 from the generator 20 is incident upon a target 22 which, in the absence of a feedback loop, is at a fixed potential with respect to the cathode potential of the electron beam generator 20. Secondary electrons then are emitted from target 22. A proportion 23 of these secondary electrons having the appropriate energy are intercepted by a velocity analyzer 24 which accepts electrons within an energy range fixed with respect to the cathode potential of the electron beam generator 20. The output of the velocity analyzer 24 is fed to an amplifier 25 whose output voltage is coupled through a capacitor 26 to the target 22. The output from the amplifier also is connected to an output terminal 27 from which may be obtained the required information about the variation of the potential across the surface of the target 22.

The feedback control loop between the velocity analyzer 24 and target 22 operates in a manner analogous to the loop in the scanning mirror microscope described above. In the scanning electron microscope, the potential difference between the primary electron beam cathode and the target is so large, the energy distribution of secondary electrons (expressed as a function of energy with respect to the potential of that part of the target from which they are emitted) is nearly independent of small variations of the surface potential of the target. However if the energy distribution is expressed as a function of energy with respect to some fixed potential, this fact implies that the secondary electron energy distribution is dependent upon such variations of potential. Therefore, the electron current intercepted by the velocity analyzer is a function of the potential of the target surface. This point may be contrasted with the fact that in the mirror microscope, the target current is a function of the potential with respect to the cathode of the target surface. Hence by analogy, in the case of the scanning electron microscope, instead of a measure of the target current variations fed to the input of the feedback amplifier, the input to the amplifier is a measure of the derived from the interception of electrons by the velocity analyzer; and instead of the voltage output from the amplifier being fed to the primary electron beam cathode, it is fed to the target.

It is to be understood that the foregoing description of specific examples of this invention is made by way of example only and is not to be considered as a limitation on its scope.

I claim:

1. An electron bombardment examination device comprising; a scanning mirror microscope including means to scan an electron beam across a target and a cathode; and a feedback control loop adapted to be actuated by the output current from said target, said loop being connected to control the potential difference between said cathode and said target in a manner to reduce fluctuations in said output current as said electron beam scans over the surface of said target.

2. The invention as defined in claim 1, wherein said feedback control loop includes an amplifier responsive to said output current for controlling the potential difference between said target and said cathode inversely therewith.

3. An electron bombardment examination device comprising: a scanning electron microscope including means to scan an electron beam across a target; a velocity analyzer; and a feedback control loop adapted to be actuated by the output from said velocity analyzer to control the potential of said target according to the electron energy level accepted by said velocity analyzer and in such a manner as to reduce fluctuations in said output as the electron beam scans the surface of the target.

4. The invention as defined in claim 3, wherein said feedback control loop includes an amplifier responsive to the output of said velocity analyzer for controlling the potential of said target inversely therewith, said velocity analyzer being positioned to intercept secondary electrons from said target.